United States Patent
Hiraiwa

(10) Patent No.: US 6,959,299 B2
(45) Date of Patent: Oct. 25, 2005

(54) INFORMATION PRESENTATION APPARATUS WITH META-INFORMATION MANAGEMENT FUNCTION

(75) Inventor: Shinichi Hiraiwa, Chiba (JP)

(73) Assignee: Fujitsu Limited, Kawasaki (JP)

( * ) Notice: Subject to any disclaimer, the term of this patent is extended or adjusted under 35 U.S.C. 154(b) by 434 days.

(21) Appl. No.: 09/127,954

(22) Filed: Aug. 3, 1998

(65) Prior Publication Data

US 2002/0023068 A1 Feb. 21, 2002

(30) Foreign Application Priority Data

Jan. 20, 1998 (JP) .......... 10-008416

(51) Int. Cl.$^7$ .......... G06F 17/30
(52) U.S. Cl. .......... 707/101; 707/10; 709/203; 709/219; 709/223
(58) Field of Search .......... 707/10, 100, 101; 709/223, 203, 219

(56) References Cited

U.S. PATENT DOCUMENTS

| | | | | |
|---|---|---|---|---|
| 5,793,966 A | * | 8/1998 | Amstein et al. | 709/203 |
| 5,893,114 A | * | 4/1999 | Hashimoto et al. | 707/200 |
| 5,897,643 A | * | 4/1999 | Matsumoto | 707/511 |
| 5,933,832 A | * | 8/1999 | Suzuoka et al. | 707/101 |
| 6,006,217 A | * | 12/1999 | Lumsden | 707/2 |
| 6,012,083 A | * | 1/2000 | Savitzky et al. | 709/202 |

* cited by examiner

*Primary Examiner*—Luke S. Wassum
*Assistant Examiner*—Khanh Pham
(74) *Attorney, Agent, or Firm*—Staas & Halsey LLP

(57) ABSTRACT

A high-speed information collection utilizing a meta-information management unit which manages update information pertaining to documents. An information presentation apparatus, an information collection apparatus, and a client are connected via a network. The information presentation apparatus presents document information stored in a document storage unit to an information collection apparatus. The information presentation apparatus has a meta-information management unit, which generates update information pertaining to individual documents, and a meta-information table which records the update information. When the information collection apparatus makes a collection request to the information presentation apparatus, the meta-information management unit references the meta-information table and generates a list of updated documents from all of the stored documents and/or collection targets, and presents the list to information collection apparatus which subsequently retrieves only the updated documents.

13 Claims, 8 Drawing Sheets

| Check date | 1997.09.14.0000 | 1997.09.16.0000 | 1997.09.18.0000 |
|---|---|---|---|
| Serial number | 1 | 2 | 3 |

| Document name | Update date/time | Update date/time | Update date/time |
|---|---|---|---|
| Document 1 | 1997.09.10.1420 | 1997.09.10.1420 | 1997.09.10.1420 |
| Document 2 | 1997.09.14.1029 | 1997.09.15.1616 | 1997.09.17.1013 |
| Document 3 | 1997.09.01.0850 | 1997.09.01.0850 | 1997.09.17.1705 |
| Document 4 | 1997.09.07.1531 | 1997.09.07.1531 | -- |
| Document 5 | -- | -- | 1997.09.17.1233 |
| : | : | : | : |

FIG. 3

| Check date | 1997.09.14.0000 | 1997.09.16.0000 | 1997.09.18.0000 |
|---|---|---|---|
| Serial number | 1 | 2 | 3 |

| Document name | Update date/time | Update date/time | Update date/time |
|---|---|---|---|
| Document 1 | V1 | V1 | V1 |
| Document 2 | V1 | V2 | V3 |
| Document 3 | V1 | V1 | V2 |
| Document 4 | V1 | V1 | -- |
| Document 5 | -- | -- | V1 |
| : | : | : | : |

FIG. 4

| Update date/time | Serial number | Modification |
|---|---|---|
| 1997.09.15.1616 | 1 | Document 2 Updated |
| 1997.09.17.0905 | 2 | Document 4 Deleted |
| 1997.09.17.1013 | 3 | Document 2 Updated |
| 1997.09.17.1233 | 4 | Document 5 Created |
| 1997.09.17.1705 | 5 | Document 3 Updated |
| : | : | : |

FIG. 5

Last check time (1997.09.18.0000)

| Document name | Status |
|---|---|
| Document 2 | Modified |
| Document 4 | Deleted |
| Document 5 | New |
| ⋮ | ⋮ |

FIG. 6

| Information collection apparatus name |
|---|
| Apparatus A |
| Apparatus B |
| Apparatus C |
| ⋮ |

FIG. 7

INFORMATION PRESENTATION APPARATUS WITH META-INFORMATION MANAGEMENT FUNCTION

CROSS-REFERENCE TO RELATED APPLICATIONS

The present application claims priority under 35 USC §119 from Japanese Patent Publication No. 10-008416 which is incorporated herein by reference.

BACKGROUND OF THE INVENTION

The present invention concerns a meta-information presentation apparatus equipped with an information management function which allows an information collection apparatus to efficiently collect information.

In recent years, a decentralized hypertext system known as the World Wide Web ("WWW") has become popular and has proliferated rapidly. The main, public portion of the WWW is carried by the increasingly popular Internet, but smaller private subsets may be formed in LANs and are called Intranets. The growth of the public WWW has been exponential, such that an enormous amount of information is now presented on the WWW. The WWW comprises a plurality of WWW servers which provide information, and clients (termed "browsers") which are used to access the information. A single WWW server typically manages a plurality of "web pages" joined together by links. A user accesses (or "surfs") information on the WWW using a browser by following the links to different web pages.

A "search engine" is often used to search information in the web pages on the WWW. A search engine effects a search function by using an information collection apparatus, termed a "web robot", which collects information provided by a WWW server and then prepares an index on the collected information.

Typically, a web robot collects web page information by accessing all of the web pages on the WWW (managed by numerous WWW servers) one page at a time by following the links in each page. Because WWW server information is updated daily, a web robot must periodically access each WWW server to gather the information required for a search. Heretofore, information has been collected by accessing all web pages regardless of whether the content of the web page has been updated. In other words, the web robot retrieves each and every page each time it is run regardless of whether it had retrieved the page before.

When a web robot sequentially accesses all the web pages that a WWW server manages, a web robot places a large burden on the WWW server by continuously connecting to and accessing WWW pages on the WWW server. At the same time, the web robot collects a great quantity of information and therefore causes increased network traffic. Additionally, when the server stores a great number of WWW pages, an enormous amount of time is required to cycle through all of the web pages, causing a delay in updating the data used by the search engine. Thus, depending on the search engine, it is impossible to search the most recent information.

SUMMARY OF THE INVENTION

It is an object of the present invention to alleviate the burden on information presentation apparatus and associated networks while affording information collection at a high speed by furnishing a meta-information management unit which manages update information on documents in an information presentation apparatus.

Additional objects and advantages of the invention will be set forth in part in the description which follows, and, in part, will be obvious from the description, or may be learned by practice of the invention.

BRIEF DESCRIPTION OF THE DRAWINGS

These and other objects and advantages of the invention will become apparent and more readily appreciated from the following description of the preferred embodiments, taken in conjunction with the accompanying drawings of which:

FIG. 3 is an example of a meta-information table for use with the preferred embodiment of the present invention.

FIG. 4 is another example of a meta-information table for use with the preferred embodiment of the present invention.

FIG. 5 is yet another example of a meta-information table for use with the preferred embodiment of the present invention.

FIG. 6 is an example of a collected documents table for use with the preferred embodiment of the present invention.

FIG. 7 is an example of an information collection apparatus table for use with the preferred embodiment of the present invention.

DESCRIPTION OF THE PREFERRED EMBODIMENTS

Figure 1:
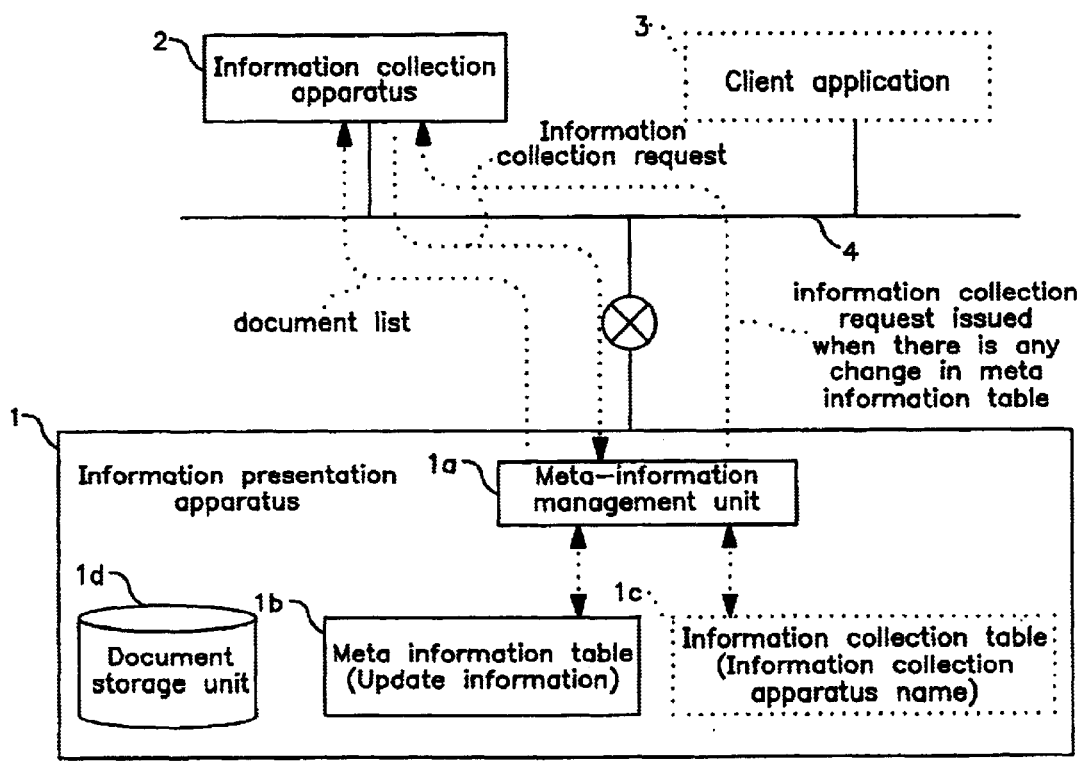
FIG. 1 is a high level block diagram of the present invention.

Reference will now be made in detail to the present preferred embodiments of the present invention, examples of which are illustrated in the accompanying drawings, wherein like reference numerals refer to like elements throughout.

FIG. 1 is a high level block diagram of the present invention. The present invention generally comprises an information presentation apparatus 1 connected to an information collection apparatus 2 and a client application 3 via a network 4.

The information presentation apparatus 1 generally comprises: a meta-information management unit 1a, a meta-information table 1b which stores update information pertaining to documents managed by the information presentation apparatus 1; a document storage unit 1d that stores the documents; and an information collection table 1c. The meta-information management unit 1a manages document update information for documents stored in the document storage unit 1d and references the meta-information table 1b when an information collection request is made by the information collection apparatus 2.

Update information pertaining to documents stored in the meta-information table 1b may include: the time of document updating, version information, and serial numbers indicating an update sequence. In general, the meta-information table 1b indicates which documents have been modified and at which time the documents were so modified.

The term "modify" refers to the creation, updating or deletion of a document. The meta-information management unit 1a generates and transmits a stored document list (including update information or, more simply, a list of documents updated since the previous request) in response to an information collection request from the information collection apparatus 2.

The information collection table 1c registers the name of each information collection apparatus 2 which issues information collection requests. Using the names of information collection apparatus 2 registered in the information collection table 1c, the meta-information management unit 1a may request each information collection apparatus 2 to issue an information collection request when there is any change in meta-information table 1b. In other words, the information collection table 1c allows information collection to be carried more efficiently by allowing the meta-information management unit 1a to request registered information collection apparatus 2 to collect information when there is any change in the meta-information table 1b.

In the present invention, the update information in the meta-information table 1b allows information to be collected efficiently by the information collection apparatus 2. The information collection apparatus 2 no longer carries out an information collection process for information that has not been updated (i.e., information and documents already collected by the information collection apparatus 2) thereby relieving a large burden on the information presentation apparatus 1. Additionally, because the effectiveness of information collection is raised, a search engine based on the information collection apparatus 2 can also provide newer information to the user.

Figure 2:
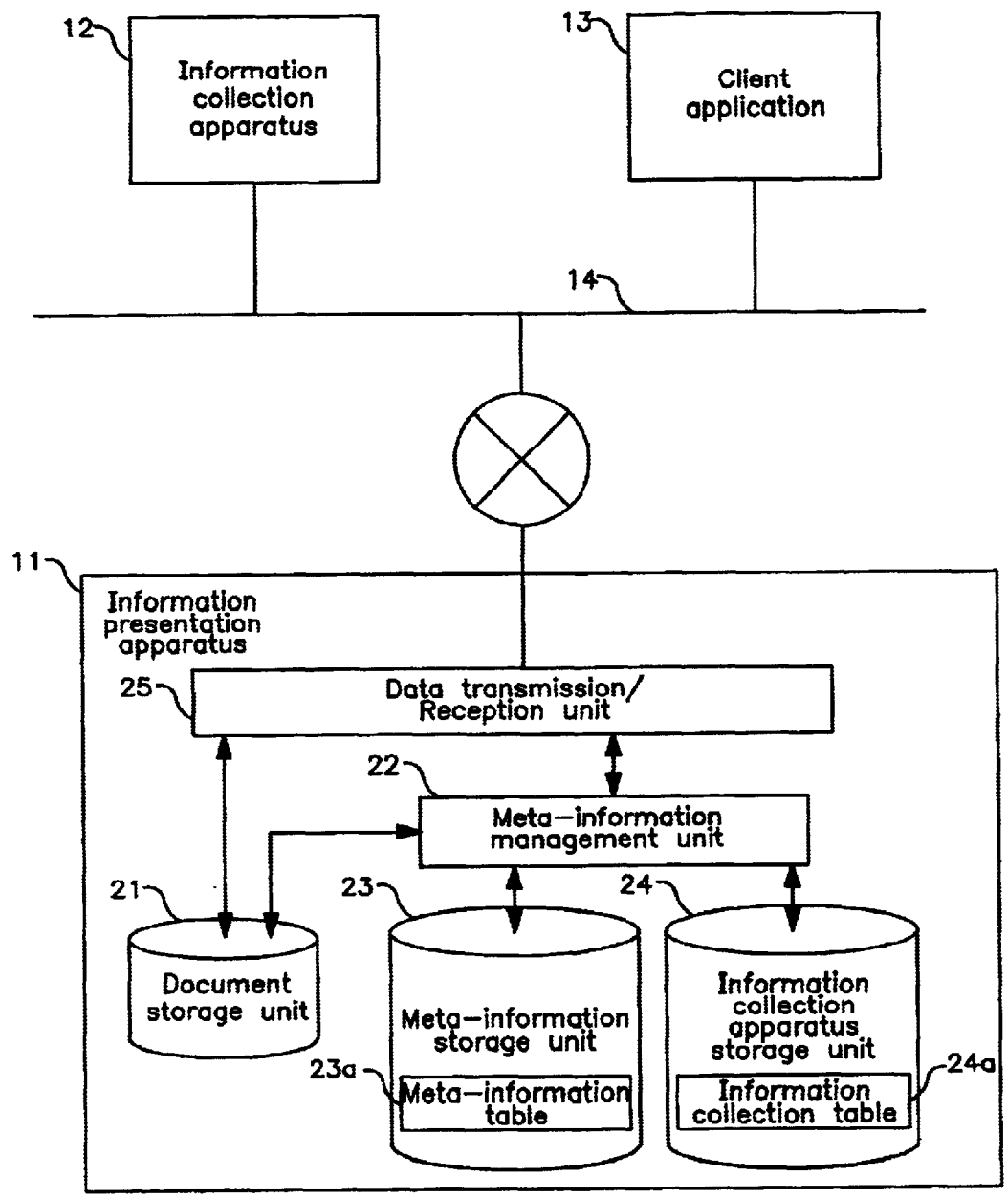
FIG. 2 is a block diagram of a preferred embodiment of the present invention.

FIG. 2 is a block diagram of a preferred embodiment of the present invention. The preferred system generally comprises an information presentation apparatus 11 (such as a WWW server), an information collection apparatus 12 (such as a web robot) and a client application 13 (such as a "web browser"). The information presentation apparatus 11, the information collection apparatus 12, and the client application 13 are connected via a network 14 (such as the Internet or an Intranet).

The information presentation apparatus 11 generally comprises a document storage unit 21 (such as a hard disk, magneto-optical disk or CD-ROM), a meta-information management unit 22 (typically embodied in software), a meta-information storage unit 23 (such as a hard disk, magneto-optical disk or CD-ROM) having a meta-information table 23a (typically formed in software), an information collection apparatus storage unit 24 (such as a hard disk, magneto-optical disk or CD-ROM) having an information collection table 24a (typically formed in software), and a data transmission/reception unit 25 (typically comprising a network adaptor, modem and/or associated software).

During normal operation, periodically, or when a document has been updated, the meta-information management unit 22 accesses a document saved in the document storage unit 21 and saves the document name along with document update information in the meta-information table 23a of the meta-information storage unit 23.

FIGS. 3, 4, and 5 are examples of the meta-information table 23a for use with the preferred embodiment of the present invention.

FIG. 3 shows an example in which the meta-information table 23a is generated periodically and in which the update information comprises a date and time. The update date/time of each document 1, 2, . . . is checked at each check date, and the update date/time of each document is written into the meta-information table 23a.

FIG. 4 shows an example in which the meta-information table 23a is generated periodically and in which update information comprises version information pertaining to individual documents. The version information pertaining to each document 1, 2, . . . is checked at each check date, and written into the meta-information table 23a.

FIG. 5 shows an example in which the meta-information table 23a is modified when a document has been updated. File names associated with the serial numbers and a differentiation (for example: updated/deleted/new) are written into the meta-information table 23a in order of update date/time sequence (as indicated by the serial number). Thus, in effect the meta-information table 23a forms a modification history of the documents on said document storage unit 21.

Referring once again to FIG. 2, the data transmission/reception units' 25 process of transmission and reception of data with the information collection apparatus 12 and the client application 13 will be explained. When the client application 13 makes an information acquisition request (such as for a web page) to the information presentation apparatus 11, the data transmission/reception unit 25 retrieves the relevant information from document storage unit 21 and sends the retrieved information to the client application 13.

On the other hand, when the information collection apparatus 12 makes a collection request to the information presentation apparatus 11, the time (if the meta-information table 23a as shown in FIG. 3 is used) when the previous collection was carried out is also specified. The data transmission/reception unit 25 receives and formats the request to the meta-information management unit 22. The meta-information management unit 22 searches the meta-information table 23a for documents modified since the specified time and generates a collected documents table. The data transmission/reception unit 25 returns the created collected documents table to the information collection apparatus 12.

FIG. 6 is an example of a collected documents table for use with the preferred embodiment of the present invention. The collected documents table registers updated documents, deleted documents, and newly created documents.

FIG. 7 is an example of an optional information collection apparatus table 24a for use with the preferred embodiment of the present invention. The name of information collection apparatuses 12 may be registered in the information collection table 24a of the information collection apparatus storage unit 24. The information presentation apparatus 11 requests registered information collection apparatus 12 to issue a collection request to collect information when the meta-information table 23a has been modified. This can further decrease network traffic in that Web robots only accesses WWW servers when informed that new information is present.

Figure 8:
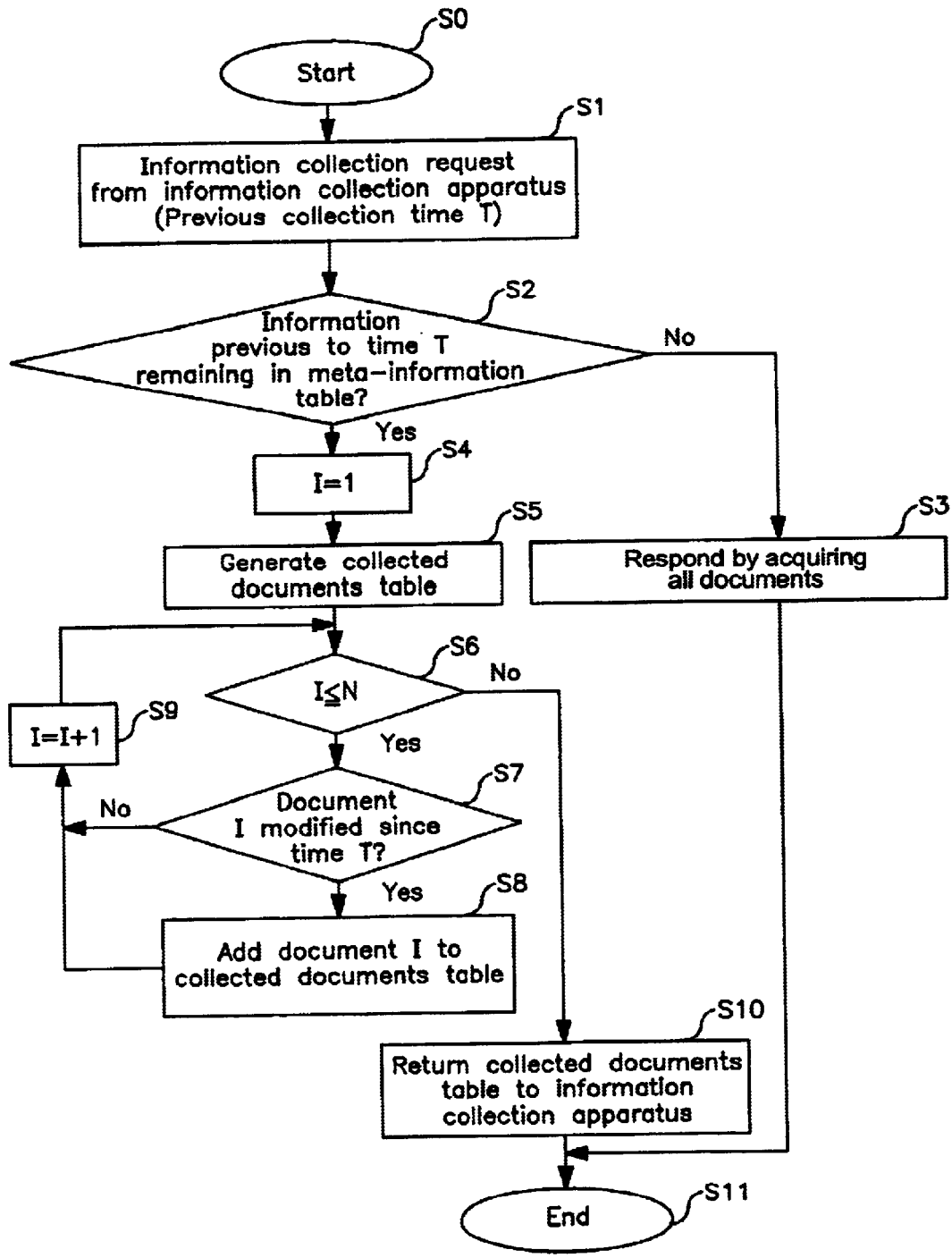
FIG. 8 is a flowchart of an information collection process in accordance with a preferred embodiment of the present invention.

FIG. 8 is a flowchart of an information collection process in accordance with a preferred embodiment of the present invention. This particular process utilizes the meta-information table 23a shown in FIG. 3. The process starts in step S0. In step S1, the information collection apparatus 12 makes a collection request to the information presentation apparatus 11, specifying a time T when a previous collection was made. This request is issued periodically at set intervals or at the request of the information presentation apparatus 11, as discussed above. When the data transmission/reception unit 25 receives the request, it transmits the request to the meta-information management unit 22.

In step S2 the meta-information management unit 22 checks whether information received prior to the time T remains in meta-information table 23a (see FIG. 3). If such information does not remain, the process goes to step S3 and the meta-information management unit 22 acquires all documents on behalf of information collection apparatus 12. If information received prior to the time T remains in the meta-information table 23a, the process goes to Step S4 and "I" is set to equal 1. Next, in Step S5, the collected documents table (shown in FIG. 6) is generated.

Thereafter, in Step S6, assuming a number of documents N, a check is made as to whether I≦N (i.e., to determine if all documents have been processed). If I≦N, the process goes to Step S7 and after the meta-information table 23a is referenced, a check is made as to whether document I has been modified since time T (Step S7). If document I has not been modified since time T, the process goes to Step S9 and I is incremented to I+1. Thereafter, the process repeats from Step S6.

If, in Step S7, document I has been modified since time T, the process goes to Step S8 and a reference to document I is added to the collected documents table. Thereafter, the process goes to Step S9 (I=I+1) and returns to Step S6.

When I becomes greater than N in Step S6, (all documents have been processed), the process goes to Step S10 and the data transmission/reception unit 25 returns the completed collected documents table to information collection apparatus 12. The process ends in Step S11. Thereafter, based on the collected documents table sent from the information presentation apparatus 11, the information collection apparatus 12 acquires only the required updated or new documents.

The flowchart in FIG. 8 pertains to a situation in which the meta-information table 23a as shown in FIG. 3 was used. However, a collected documents table can also be generated using a similar process when version information of individual documents, as shown in the meta-information table 23a in FIG. 4 is used.

Figure 9:
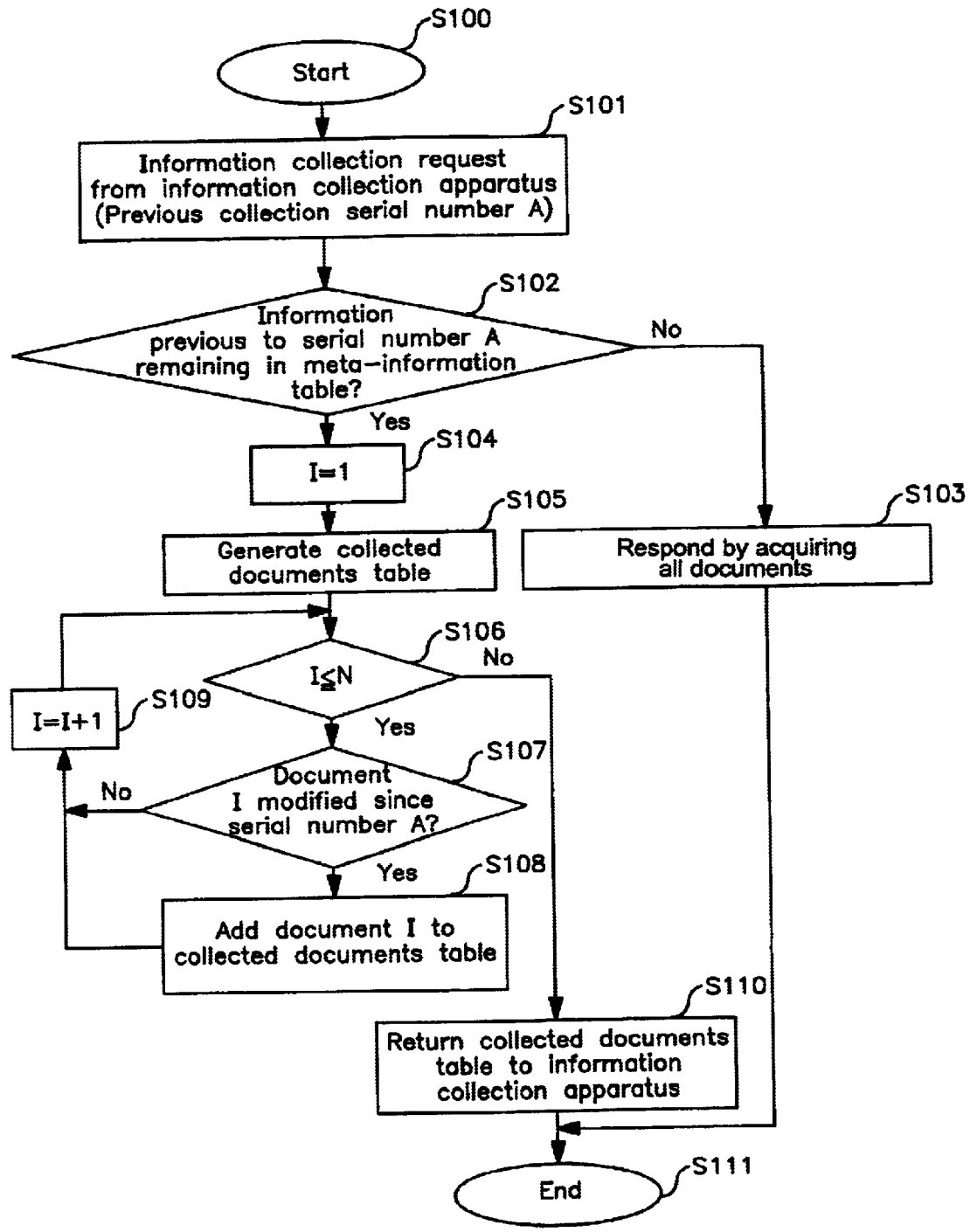
FIG. 9 is a flowchart of another information collection process in accordance with a preferred embodiment of the present invention.

FIG. 9 is a flowchart of an information collection process in accordance with a preferred embodiment of the present invention. This particular process utilizes the meta-information table 23a shown in FIG. 5. The process starts in Step S100. In Step S101, the information collection apparatus 12 makes a collection request, to the information presentation apparatus 11, specifying a serial number A for the previous collection. When the data transmission/reception unit 25 receives the request, it transmits the request to the meta-information management unit 22.

In Step S102, the meta-information management unit 22 checks whether information received prior to the modification indicated by serial number A remains in the meta-information table 23a (see FIG. 5). If such information does not remain, the process goes to Step S103 and the meta-information management unit 22 responds by acquiring all documents on behalf of the information collection apparatus 12.

If, in Step S102, information received prior to the modification indicated by serial number A remains in the meta-information table 23a the process goes to Step S104 and "I" is set to equal 1. Thereafter, in Step S105, the collected documents table (shown in FIG. 6) is generated.

In Step S106, assuming a number of documents N, a check is made as to whether I≦N, and if I≦N the process goes to Step S107. In step S107, the meta-information table 23a is referenced and a check is made as to whether a document I has been modified since the modification indicated by serial number A. If document I has not been modified since modification indicated by serial number A, the process goes to Step S109 and I is incremented to I+1. The process then returns to Step S106. If, in step S107, document I has been modified since the modification indicated by serial number A, the process goes to Step S108 and document I is added to the collected documents table. Thereafter, the process goes to Step S109 (I=I+1) and the process returns to Step S106.

When in Step S106, I becomes greater than N, the process goes to Step S110 and the data transmission/reception unit 25 returns the generated collected documents table to the information collection apparatus 12. The process ends in Step S111. Thereafter, based on the collected documents table sent from the information presentation apparatus 11, the information collection apparatus 12 acquires only the documents which are new or updated.

When, in either foregoing processes (FIG. 8 or FIG. 9), the collected documents table is returned, the collected documents table may be compressed, thereby decreasing transmission time to the information collection apparatus 12. In addition, when the collected documents table is returned to the information collection apparatus 12, the up-to-date documents stored in the document storage unit 21 may be sent to the information collection apparatus 12 together with the collected documents table.

Although a preferred embodiments of the present invention have been shown and described along with some possible variations, it will be appreciated by those skilled in the art that further changes and variations may be used without departing from the principles and spirit of the invention, the scope of which is defined in the claims and their equivalents.

Generally, in the present invention, a meta-information management function is provided in an information presentation apparatus. The meta-information enables an information collection apparatus to carry out an information collection process efficiently by indicating which documents have been modified since a previous request. The burden on the information presentation apparatus as well as on a network is alleviated. Consequently, the number of information updates can be increased, allowing searches to be carried out with newer data.

I claim:

1. An information presentation apparatus connected to an information collection apparatus via a network, the information presentation apparatus comprising:

a document storage unit which stores documents;

a meta-information table that stores information about said documents; and a meta-information management unit which generates update information about each stored document and records the update information in the meta-information table, and when the information collection apparatus makes a request for the stored documents, said meta-information management unit references said meta-information table, and based on comparing the update information in said meta-information table with predetermined criteria, generates a list of documents corresponding to the predetermined criteria and transmits the list to the information collection apparatus.

2. An information presentation apparatus, as set forth in claim 1, wherein when the information collection apparatus makes a request for documents, said meta-information management unit references the meta-information table and prepares a list of documents modified since a previous request for collection by the information collection apparatus, and a separate list of documents for deletion.

3. An information presentation apparatus, as set forth in claim 1, wherein said meta-information management unit records an update time for each document in the meta-information table.

4. An information presentation apparatus, as set forth in claim 1, wherein said meta-information management unit records version information about each document in the meta-information table.

5. An information presentation apparatus, as set forth in claim 1, wherein said meta-information management unit records update information pertaining to each document and a time when updates were last checked, in the meta-information table; and wherein the information collection apparatus issues an information collection request along with an indication of a previous time at which an information collection request was issued and wherein the list of documents only includes documents updated since that time.

6. An information presentation apparatus, as set forth in claim 1, wherein said meta-information management unit records update information pertaining to each individual document along with a serial number of the document in the meta-information table;

wherein the information collection apparatus issues an information collection request including a serial number related to the previous time at which an information collection request was made and wherein the list of documents only includes documents updated subsequent to that serial number.

7. An information presentation apparatus as set forth in claim 1, wherein the information presentation apparatus further comprises:

an information collection table that stores the name of the information collection apparatus, and when the meta-information table has been modified, said meta-information management unit sends a request for information collection to the information collection apparatus stored in said information collection table.

8. An information presentation apparatus, as set forth in claim 1, wherein the information presentation apparatus compresses the list prior to transmitting the list to the information collection apparatus.

9. An information presentation apparatus, as set forth in claim 1, wherein the information presentation apparatus transmits the documents referenced in the list along with the document list to the information collection apparatus.

10. A web page server comprising:

a document storage unit that stores web pages;

a meta-information table that stores information including a status of each web page stored in said document storage unit; and management software that provides the following functions:

monitoring modification of the web pages in said document storage unit;

updating said meta-information table based on the monitoring function; and creating, in response to a collection request, a list of web pages in said document storage that have been modified since a previous collection request so that the collection request only retrieves previously unretrieved documents, thereby reducing the load on the web page server.

11. An information presentation apparatus connected to an information collection apparatus via a network, the information presentation apparatus comprising:

a meta-information table which stores information about documents managed by the information presentation apparatus; and a meta-information management unit which generates update information about each managed document and records said update information in said meta-information table, wherein when the information collection apparatus requests said managed documents, said meta-information management unit references said meta-information table, and based on comparing said update information in said meta-information table with predetermined criteria specified in said request, generates a list of documents corresponding to the predetermined criteria and transmits the list to the information collection apparatus such that a number of access times to the information presentation apparatus by the information collection apparatus is reduced.

12. An information presentation apparatus for managing documents and for communicating with an information collection apparatus via a network, the information presentation apparatus comprising:

a first table which stores information about the documents;

a second table which stores a network name for the information collection apparatus; and a meta-information management unit which:

generates update information about each document and records the update information in the first table, and requests the information collection apparatus to issue an information collection request where a change occurs in the information stored in the first table.

13. The information presentation apparatus of claim 12, wherein when the information collection apparatus makes a request for the documents stored on the information presentation apparatus and the information collection apparatus identifies a time of a previous request, the information management unit:

references the first table and generates a list of documents for which a changed has occurred since the time of the previous request; and the meta information management unit transmits the generated list to the information collection apparatus using the network name stored in the second table.

\* \* \* \* \*